US009436616B2

(12) United States Patent
Sharp et al.

(10) Patent No.: US 9,436,616 B2
(45) Date of Patent: Sep. 6, 2016

(54) MULTI-CORE PAGE TABLE SETS OF ATTRIBUTE FIELDS

(71) Applicant: QUALCOMM Incorporated, San Diego, CA (US)

(72) Inventors: Colin Christopher Sharp, San Diego, CA (US); Thomas Andrew Sartorius, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 236 days.

(21) Appl. No.: 13/888,069

(22) Filed: May 6, 2013

(65) Prior Publication Data
US 2014/0331023 A1 Nov. 6, 2014

(51) Int. Cl.
G06F 12/00 (2006.01)
G06F 12/10 (2016.01)
G06F 12/14 (2006.01)

(52) U.S. Cl.
CPC ......... G06F 12/1009 (2013.01); G06F 12/145 (2013.01)

(58) Field of Classification Search
CPC .................. G06F 12/1009; G06F 12/1072
USPC ........................................................ 711/206
See application file for complete search history.

(56) References Cited

U.S. PATENT DOCUMENTS

| 6,286,092 | B1 | 9/2001 | Frank et al. |
| 6,446,034 | B1 | 9/2002 | Egolf |
| 7,444,636 | B2 | 10/2008 | Noel et al. |
| 7,490,216 | B1 | 2/2009 | Chen et al. |
| 8,244,981 | B2 | 8/2012 | Wang et al. |
| 2003/0009640 | A1* | 1/2003 | Arimilli .............. G06F 12/0888 711/147 |
| 2007/0168644 | A1* | 7/2007 | Hummel et al. .............. 711/207 |
| 2008/0046666 | A1 | 2/2008 | Termaine et al. |
| 2009/0150620 | A1 | 6/2009 | Paver et al. |
| 2009/0157975 | A1 | 6/2009 | Sathaye et al. |
| 2011/0016290 | A1 | 1/2011 | Chobotaro et al. |
| 2011/0161620 | A1* | 6/2011 | Kaminski et al. ............ 711/207 |
| 2014/0040593 | A1 | 2/2014 | Sharp et al. |

FOREIGN PATENT DOCUMENTS

WO 2012125202 A1 9/2012

OTHER PUBLICATIONS

International Search Report and Written Opinion—PCT/US2014/035036—ISA/EPO—Sep. 23, 2014, 9 pp.
International Preliminary Report on Patentability from International Application No. PCT/US2014/035036, dated Jul. 30, 2015, 6 pp.

* cited by examiner

Primary Examiner — Ryan Bertram
Assistant Examiner — Edmund Kwong
(74) Attorney, Agent, or Firm — Shumaker & Sieffert, P.A.

(57) ABSTRACT

A device includes a memory that stores a first page table that includes a first page table entry, wherein the first page table entry further includes a physical address, an alternative location associated with the page table entry, and a physical page of memory associated with the physical address. A first processing unit is configured to: read the first page table entry, and determine the physical address from the first page table entry. The second processing unit is configured to: read the physical address from the first page table entry, determine second page attribute data from the alternative location, wherein the second page attribute data define one or more accessibility attributes of the physical page of memory for the second processing unit, and access the physical page of memory associated with the physical address according to the one or more accessibility attributes.

52 Claims, 4 Drawing Sheets

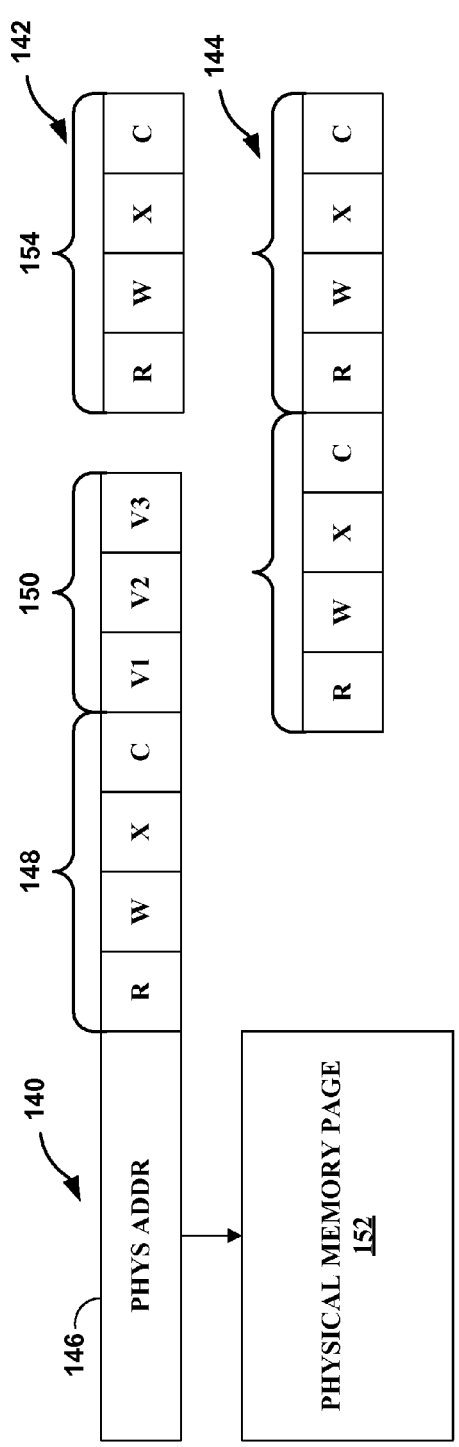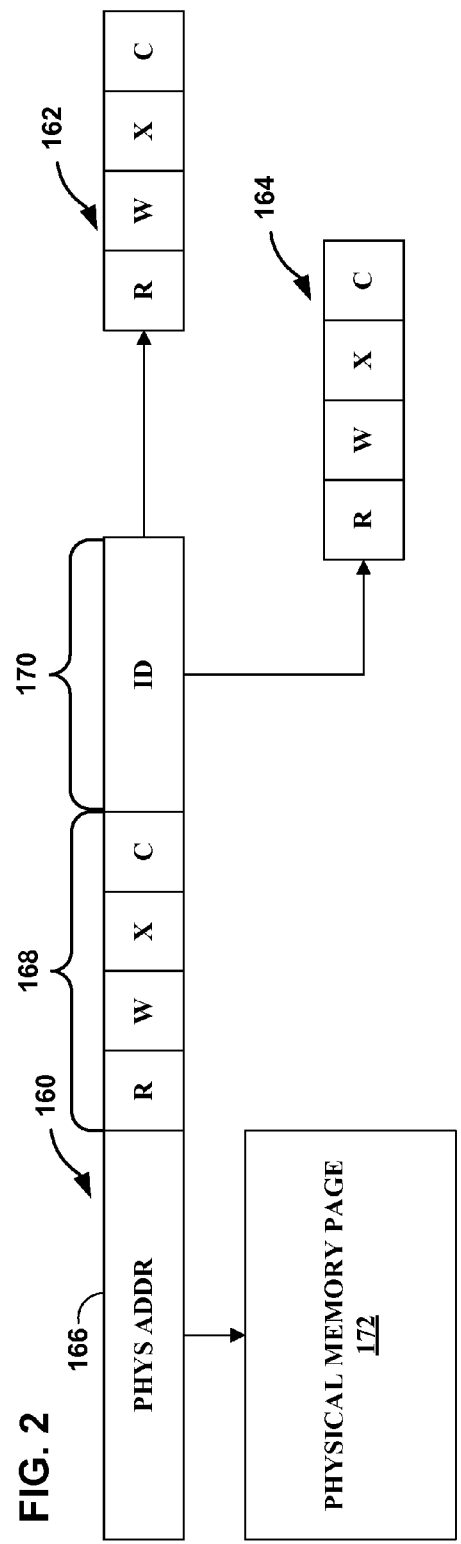

MULTI-CORE PAGE TABLE SETS OF ATTRIBUTE FIELDS

This application is related to U.S. patent application Ser. No. 13/565,434, filed on Aug. 02, 2012, the entire contents of which are hereby incorporated by reference.

TECHNICAL FIELD

The present disclosure generally relates to computing and more particularly relates to techniques for mapping a virtual memory address space to a physical memory address space.

BACKGROUND

Typical computing systems include multiple processing units, such as central processing units (CPUs) and graphics processing units (GPUs), which read from and write to a physical memory. The various processing units of a device may implement virtual addressing schemes such that applications being executed by clients can be assigned a contiguous virtual address space without having to set aside a contiguous physical memory space. Each processing unit typically has a memory management unit (MMU) to translate the virtual memory addresses to physical addresses in the physical memory. To perform the required virtual address to physical address mapping, each MMU maintains a separate page table in system memory, and each of these separate page tables can be several megabytes in size.

SUMMARY

In general, the techniques described in this disclosure are related to computing devices that implement virtual address to physical address mapping. According to the techniques of this disclosure, two or more processing units may share a common page table for mapping virtual addresses to physical addresses. A first processing unit may read a first page table entry for mapping the virtual address to a physical address. A second processing unit may read the first page table entry and an additional second page table entry when mapping from the virtual address to the physical address. The single first table entry may include attributes of the memory page associated with the physical memory address for the first processing unit. The second page table entries may include additional attributes sets that correspond to the attributes of the same physical memory address for the second processing unit. Additionally, the first page table entry may include data that identifies the second page table entry for the second processing units, which include the additional page table entries. Using the multiple sets of attribute fields, the attributes, which may comprise permissions of a memory page for the first and second processing units, may be managed individually. For example, the techniques described in this disclosure may allow for individual management of the read/write, execution, caching, and other attributes and/or permissions of a page of memory for first and second processing units.

According to one example, an apparatus includes memory that stores a first page table that includes a first page table entry, wherein the first page table entry further includes a physical address, an alternative location associated with the first page table entry, and a physical page of memory associated with the physical address. A first processing unit is configured to read, from the first page table, the physical address, determine first page attribute data from the first page table entry, wherein the first page attribute data define one or more accessibility attributes of the physical page of memory for the first processing unit, and access the physical page of memory associated with the physical address according to the one or more accessibility attributes of the first page attribute data. A second processing unit is configured to read, from the first page table, the first page table entry, determine the physical address from the first page table entry, determine second page attribute data from the alternative location, wherein the alternative location is associated with the first page table entry, and wherein the second page attribute data define one or more accessibility attributes of the physical page of memory for the second processing unit, and access the physical page of memory associated with the physical address according to the one or more accessibility attributes of the second page attribute data.

According to another example, a method of accessing memory includes reading, with a first processing unit, a physical address from a first page table entry in a first page table, determining, with the first processing unit, first page attribute data from the first page table entry, wherein the first page attribute data define one or more accessibility attributes of the physical page of memory for the first processing unit, reading, with the second processing unit, the physical address from the first page table entry in the first page table, determining, with the second processing unit, second page attribute data from an alternative location, wherein the alternative location is associated with the first page table entry, and wherein the second page attribute data define one or more accessibility attributes of the physical page of memory for the second processing unit, accessing, with the first processing unit, a physical page of memory associated with the physical address according to the one or more accessibility attributes of the first page attribute data, and accessing, with the second processing unit, the physical page of memory associated with the physical address according to the one or more accessibility attributes of the second page attribute data.

According to another example, an apparatus includes means for storing a first page table that includes a first page table entry, wherein the first page table entry further includes a physical address of an alternative location associated with the first page table entry, and a physical page of memory associated with the physical address. The apparatus includes first means for processing, wherein the first means for processing comprises means for reading, from the first page table entry, the physical address, means for determining first page attribute data from the first page table entry, wherein the first page attribute data define one or more accessibility attributes of the physical page of memory for the first means for processing, and means for accessing a physical page of memory with the physical address according to the one or more accessibility attributes of the first page attribute data. The apparatus includes a second means for processing, wherein the second means for processing comprises means for reading, from the first page table, the first page table entry, means for determining the physical address from the first page table entry, means for determining second page attribute data from the alternative location, wherein the alternative location is associated with the first page table entry, and wherein the second page attribute data define one or more accessibility attributes of the physical page of memory for the second means for processing, and means for accessing the physical page of memory associated with the physical address according to the one or more accessibility attributes of the second page attribute data.

According to another example, a non-transitory computer-readable storage medium stores instructions that when executed cause a first processing unit and a second processing unit to read, with a first processing unit, a physical address from a first page table entry in a first page table, determine, with the first processing unit, first page attribute data from the first page table entry, wherein the first page attribute data define one or more accessibility attributes of the physical page of memory for the first processing unit, read, with the second processing unit, the physical address from the first page table entry in the first page table, determine, with the second processing unit, second page attribute data from an alternative location, wherein the alternative location is associated with the first page table entry, and wherein the second page attribute data define one or more accessibility attributes of the physical page of memory for the second processing unit, access, with the first processing unit, a physical page of memory associated with the physical address according to the one or more accessibility attributes of the first page attribute data, and access, with the second processing unit, the physical page of memory associated with the physical address according to the one or more accessibility attributes of the second page attribute data.

BRIEF DESCRIPTION OF THE DRAWINGS

FIG. 2 is a conceptual diagram illustrating an example technique for mapping a virtual memory address to a physical memory address in accordance with the techniques of this disclosure.

FIG. 3 is a conceptual diagram illustrating an example technique for mapping a virtual memory address to a physical memory address in accordance with the techniques of this disclosure.

DESCRIPTION

Figure 1:
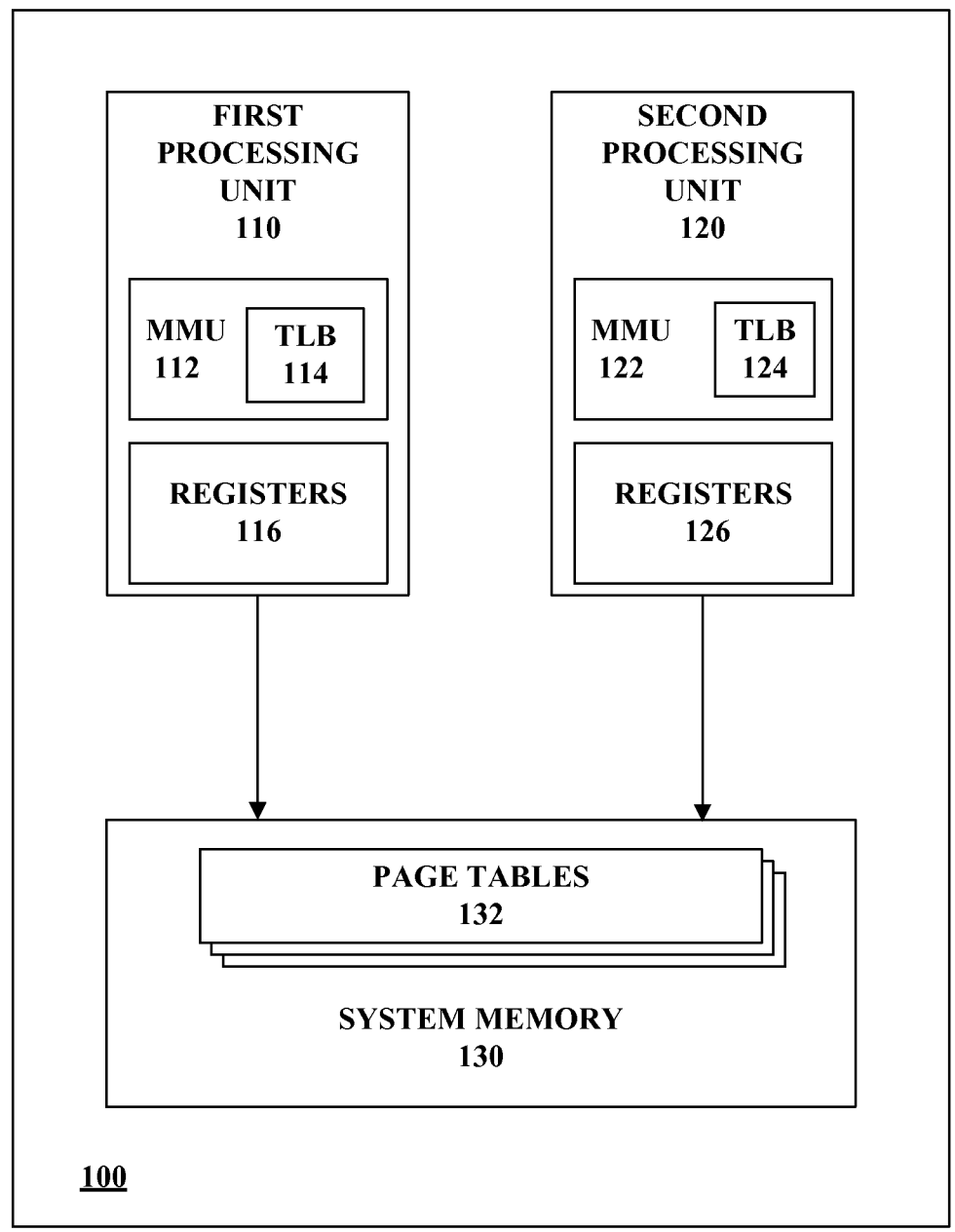
FIG. 1 is a conceptual diagram illustrating a computing device configured to implement the virtual memory address to physical memory address mapping techniques in accordance with the techniques of this disclosure.

In general, the techniques described in this disclosure are related to computing devices that implement virtual address to physical address mapping, also referred to in this disclosure as virtual-to-physical mapping. More particularly, the techniques described in this disclosure are directed to a virtual memory architecture that supports multiple attribute sets for two or more processing units. In some examples, a first page table entry of the common page table may include a first set of attribute data, such as a set of attribute data for a first processing unit (e.g., a CPU). The first page table entry may also include data associated with an alternative location, and the alternative location may include an attribute data for a second processing unit (e.g., a GPU), as well as other attribute data. Using the multiple sets of attribute data, the accessibility of a memory page for the two or more processing units may be managed individually. For example, the techniques described in this disclosure may allow for individual management of the read/write, execution, caching, and other accessibility attributes of a page of memory for first and second processing units.

Processing units such as central processing units (CPUs) and graphics processing units (GPUs) may access (e.g., reading from and writing to) a system memory. To access the system, the processing unit accesses the location within the system memory where the data is to be read from or written to with a physical address associated with the location within the memory. It may be difficult, however, for the processing unit to manage the physical addresses for all of the memory pages (i.e., the locations of the physical memory where data can be written to or read from). To overcome this difficulty, the processing unit may use virtual addressing. In virtual addressing, applications executing on the processing unit (i.e., client applications) are assigned contiguous virtual memory addresses. An application may comprise multiple jobs, with different jobs executing on different processing units. Each of the processing units may include respective memory management units (MMUs). The MMU of each of the processing units is tasked with determining the actual memory addresses, also referred to as physical memory addresses, from the virtual memory addresses.

For instance, the MMU includes a cache referred to as a translation lookaside buffer (TLB). The TLB stores the virtual-to-physical address mapping for selected memory chunks, such as recently accessed memory chunks or frequently accessed memory chunks. To access a memory chunk, referred to as a "page" of memory, the processing unit supplies the virtual memory address for that memory page to the MMU. The MMU, in turn, accesses the TLB to identify the physical memory address for that memory page. When the mapping is available in the TLB (referred to as a TLB hit), the MMU then accesses the memory page using the physical memory address. Alternatively, the MMU supplies the physical memory address to a different unit or module of the processing unit which then accesses the memory page using the physical memory address.

In some cases, the TLB may not include mapping for a virtual memory address (referred to as a TLB miss). For example, the processing unit may need to access a memory page whose physical address is not included in the page entries stored by the TLB because that memory page is not a recently accessed or frequently accessed memory page. When this occurs, the processing unit accesses a page table stored in system memory.

A page table is similar to the TLB in that both store page entries mapping virtual memory addresses to physical memory addresses. One page table entry, in the page table or in the TLB, maps one virtual memory address to one physical memory address. The page table, however, is stored in the system memory in contrast to the TLB which is stored locally within the MMU of the processing unit. Also, because the page table stores the entire virtual-to-physical address mapping for the processing unit instead of a limited number of page entries like a TLB, the size of the page table is generally much larger than the size of the TLB. For instance, the size of the page table may be megabytes in size.

In some techniques, the system memory stores corresponding page tables for each of the processing units. For example, the system memory stores a page table for the CPU and stores another, separate page table for the GPU. In some instances, however, these different page tables include identical page table entries. Thus, it may be possible that multiple page table entries in a CPU page table are identical to page table entries in a GPU page table. For example, a page table entry in the CPU page table may map one virtual memory address to a physical memory address, and a page table entry in the GPU page table may map the same virtual memory address to the same physical memory address.

As one example, an operating system executing on the CPU may be tasked with assigning contiguous virtual memory addresses to an application. The application may include a plurality of jobs or tasks, with some jobs executing on the CPU and some jobs executing on the GPU. The operating system may also store the mapping between virtual memory addresses and physical memory addresses in the page table. Because the operating system is tasked with assigning virtual memory addresses and the mapping of these virtual memory addresses to the physical addresses for both the CPU and GPU, the operating system may create a common page table that stores the virtual-to-physical mappings that are common to both the CPU and GPU.

There may be benefits in the CPU and the GPU sharing common virtual-to-physical mappings. For example, rather than the system memory storing duplicate page table entries, the system memory can store a single page entry for the identical page table entries in the CPU page table and GPU page table, which results in memory saving. Furthermore, because there is one page entry for these identical page table entries, it may be more computationally efficient to update a single page table entry instead of two identical page table entries.

Some prior techniques have been developed to achieve page table sharing. In these techniques, the CPU MMU and the GPU MMU each store pointers that point to the location of the common page table in system memory. When the CPU and GPU access a memory page, their respective MMUs use their pointers to retrieve the physical memory address from the shared page table. However, these techniques for sharing a page table may sometimes suffer from not identifying the different accessing capabilities and/or permissions of the different processing units for the memory pages.

Different accessing capabilities may be associated with the different processing units. For instance, a page entry is conventionally 32 bits or 64 bits, depending on the word size of the processing unit. Depending on the architecture of the processing units, the number of bits identifies the physical address of a page of memory, and remaining bits may be reserved for attribute data. The attribute data may identify the accessing capabilities and/or permissions of one or more processing units for that particular page of memory. As one example, some of the memory pages may be designated as being readable and writeable, and other memory pages may be designated as being only readable. Similarly, the attribute data may indicate whether a memory page is cacheable, dirty (needs to be written back to main memory from a cache, such as the TLB), or executable by one or more processing units. One or more fields of the attribute data, which may comprise one or more bits, enforce and indicate these accessibility limitations and/or permissions.

There may be other examples of attribute fields in addition to fields that designate a memory page as being readable and writeable or just readable. For example, one or more other fields of the attribute data may indicate that data within certain memory pages is non-executable, inner cacheable, outer cacheable, shareable, bufferable, dirty, and/or accessible by one or more supervisors or hypervisors. If a page is non-executable, then one or more processors may not execute the contents of the memory page. Non-executable attribute permissions may be useful, e.g., for preventing malicious code from executing the contents of a memory page.

In some examples, the attribute data of a page table entry may indicate that the contents of a memory page are inner cacheable or outer cacheable. Contents of a memory page indicated as inner cacheable may only be stored in one or more "inner" caches (e.g., an L1 cache or caches relatively closer to a processing unit), while a page marked as outer cacheable may only be cached by one or more outer caches, e.g., an L2 cache or an L3 cache, and not an L1 cache, as one example.

A page table entry may also indicate that a memory page is shareable. A page of memory may be shareable if two or more processes may share access to the page of memory, which may be useful to reduce memory consumption for commonly used memory pages, such as shared libraries. The page table entry attribute data may also mark a memory page as dirty. If the attribute data of a page table entry marks a page as "dirty," the contents of the memory page may have been changed, and a processing unit, such as first processing unit 110 or second processing unit 120 may need to write the memory page back to system memory, e.g., to an outer level cache or system memory 130.

Attribute data may also indicate whether a memory page has supervisor or hypervisor permissions. If a memory page has hypervisor permissions, code executing in that page may, for example, modify or manage code having lower permission levels, such as supervisor permissions, or user-level permissions. Hypervisor permissions may be useful, e.g. for managing virtualized operating systems (also referred to as "guest operating systems") or other virtualized resources. Similarly, supervisor permissions may be useful for performing operating system (OS)-level tasks, such as managing applications, e.g. applications executing on one or more operating systems.

A page table entry may also include attribute data that indicates whether a page is "write back" or "write through." A "write back" page must of memory be written back to a higher level of system memory, e.g. system memory 130 or a higher (e.g., outer or "backing store") level of cache, and to an inner cache simultaneously. By contrast, if page table attribute data marks a page as "write back," then a processing unit may first write the memory page to the cache, but may postpone writing the changed contents back to a higher (e.g., outer or backing store) level of cache until the cache blocks containing the memory page are about to be modified and/or replaced with new data.

Attribute data of a page table entry may also indicate whether a memory page is bufferable. If the attribute data indicates that a page is bufferable, then a processing unit may write the contents of the memory page to a write buffer to improve system performance. In some examples, a processing unit may mark certain regions of system memory 130 as bufferable, and other regions, such as I/O memory space (e.g., memory space dedicated to memory-mapped I/O), as unbufferable.

In yet another example, one or more page table attribute data fields may indicate a memory ordering (e.g., strong ordering, weak ordering, relaxed ordering) for a memory page. If attribute data of a page table entry indicates that a page of memory is strongly ordered, then every machine instruction that interacts with that page comes implicitly with acquire and release semantics. As a result, when one processing unit performs a sequence of writes, every other processing unit sees those values change in the same order that they were written. If attribute data of a page table entry indicates that a memory page is weakly ordered, writes and reads may be arbitrarily reordered, with the reordering limited only by explicit memory barriers.

Any combination of the attribute data described above may be included in a page table entry. The examples of attribute data described above are just some non-limiting examples. Other types and combinations of attribute data may also be included in a page table entry. In the manner described in the above non-limiting examples, the attribute data field values of a page table entry may indicate the accessibility and/or permissions of a physical memory page for a processing unit in accordance with the techniques of this disclosure.

In some instances, one processing unit may need different accessibility permissions than another processing unit for the same page of memory. For example, the operating system executing on a CPU may designate some pages of memory as being writeable and readable by the CPU, and designate these same pages as being only readable by the GPU. To indicate different permissions for differing processing units, each processing unit may be associated with a set of attribute data that corresponds to the memory page accessibility permissions for that processing unit. For instance, in the example described above where the CPU and the GPU include their own respective page tables, the virtual address to physical address mapping may be identical in each of the page tables, but the attribute data fields may not be identical. In the other example described above where the CPU and GPU share a common page table, the attribute data fields may be shared by both the CPU and GPU. If the attribute data fields are shared, the operating system is forced to define attribute data for either the CPU or the GPU, but not both.

For instance, the attribute data fields, in the above example, include values that define the accessibility of the CPU, but not necessarily the accessibility of the GPU. This may potentially lead to mismanagement of a memory page. For example, it may be desirable to limit the accessibility of a memory page to only be readable for a GPU (and not writeable). However, because this page is readable and writeable by the CPU and the values of the attribute data fields do not differentiate between CPU and GPU, the GPU may inadvertently write to the memory page, in examples where pointers are used into a common page table.

The techniques of the disclosure are directed to designating page attribute data specifically for different processing units. For example, GPU page attribute data define the accessibility of a memory page for the GPU, and CPU page attribute data define the accessibility for the CPU. In accordance with the techniques of this disclosure a first processing unit may reading, a physical address from a first page table entry in a first page table, determine first page attribute data from the first page table entry, wherein the first page attribute data define one or more accessibility attributes of the physical page of memory for the first processing unit. A second processing unit may read the physical address from the first page table entry in the first page table, determine second page attribute data from an alternative location, wherein the alternative location is associated with the first page table entry, and wherein the second page attribute data define one or more accessibility attributes of the physical page of memory for the second processing unit. The first processing unit may access a physical page of memory associated with the physical address according to the one or more accessibility attributes of the first page attribute data, and the second processing unit may access the physical page of memory associated with the physical address according to the one or more accessibility attributes of the second page attribute data.

FIG. 1 shows an example computing device, computing device 100, which may implement the techniques of this disclosure. Examples of computing device 100 include, but are not limited to, mobile wireless telephones, personal digital assistants (PDAs), video gaming consoles, handheld gaming units, mobile video conferencing units, laptop computers, desktop computers, television set-top boxes, digital media players, smartphones, tablet computers, cameras, and the like. Although not restricted only to resource limited devices, the techniques of this disclosure may be of particular benefit to resource limited devices including battery powered devices.

Computing device 100 includes a first processing unit 110, a second processing unit 120, and a system memory 130. First processing unit 110 includes MMU 112, and second processing unit 120 includes MMU 122. MMU 110 may include TLB 114, and MMU 122 may include TLB 124. First processing unit 110 includes registers 116, and second processing unit 120 includes registers 126. First processing unit 110 may, for example, be a CPU of device 100. Second processing unit 120 may, for example, be a GPU operable to output graphics data for presentation on a display. First processing unit 110 and second processing unit 120 may additionally represent other types of processing units such as processing units for various peripheral devices including display controllers, networking devices, or any type of digital signal processing (DSP) core that offloads signal processing from a processor such as a CPU or GPU. Examples of first processing unit 110 and second processing unit 120 may include, but are not limited to, a digital signal processor (DSP), a general purpose microprocessor, application specific integrated circuit (ASIC), field programmable logic array (FPGA), or other equivalent integrated or discrete logic circuitry. Although the techniques of this disclosure will generally be described with references to two processing units, the techniques may be implemented with more than two processing units.

Register 116 and registers 126 may contain data upon which first processing unit 110 or second processing unit 120 operate (e.g. operands). In some examples, registers 116 and registers 126 may be general purpose registers, memory address indirection registers, interrupt registers, SIMD registers, or any other type of register. In some examples registers 116 and 126 may be configured to store page attribute data for first processing unit 110 and/or second processing unit 120 in accordance with the techniques of this disclosure.

System memory 130 may be an example of a computer-readable storage medium. System memory 130 may, for example, be a type of random access memory (RAM) such as dynamic RAM, static RAM, thyrisistor RAM, zero-capacitor RAM, twin transistor RAM, or some other type of volatile memory. System memory 130 may also be a non-volatile memory, such as a flash memory or other type of non-volatile RAM. System memory 130 may store instructions that cause first processing unit 110 and processing unit 120 to perform functions ascribed to each in this disclosure. In this way, system memory 130 may be considered as a computer-readable storage medium comprising instructions that cause one or more processors, e.g., first processing unit 110 and processing unit 120, to perform various functions. In some examples, however, such instructions may be stored in a memory (not shown in FIG. 1) other than system memory 130.

First processing unit 110 and second processing unit 120 are configured to read data from and write data to system memory 130. To read or write the data, first processing unit 110 and second processing unit 120 are configured to access specific physical locations in system memory 130. These specific locations may, for example, be pages of four kilobytes (KB), two megabytes (MB), or some other size. Each page of memory may have an associated physical address. As introduced above, however, first processing unit 110 and second processing unit 120 may implement virtual addressing, such that applications executing on first processing unit 110 or second processing unit 120 are assigned contiguous virtual memory addresses. The physical memory addresses corresponding to these contiguous virtual memory addresses may, however, be fragmented and non-contiguous. Thus, first processing unit 110 and second processing unit 120 may process data using these contiguous virtual memory addresses rather than the corresponding non-contiguous physical memory addresses. When first processing unit 110 and second processing unit 120 access (i.e. read from or write to) system memory 130, however, first processing unit 110 and second processing unit 120 translate these virtual memory addresses to corresponding physical memory addresses.

MMU 112 is configured to map virtual memory addresses to physical memory addresses for first processing unit 110, and MMU 122 is configured to map virtual memory addresses to physical memory addresses for second processing unit 120. A complete page table with a full set of page entries is stored in page tables 132. In some examples, page tables 132 may also comprise a plurality of parallel page tables. In other examples, page tables 132 may comprise a single page table. Each of TLB 114 and TLB 124 stores a subset of the page table entries stored in page tables 132. The subset may, for example, be recently accessed page table entries, frequently accessed page table entries, or page table entries selected based on some other criteria. The subset of page table entries stored in TLB 114 may be different than the subset of page entries stored in TLB 124. For example, the page table entries that are recently accessed or frequently accessed by first processing unit 110 via MMU 112 may be different than the page table entries that are recently or frequently accessed by second processing unit 120 via MMU 122. Thus, TLB 114 may store a different subset of page table entries than TLB 124.

If, for example, first processing unit 110 needs to translate a virtual memory address to a physical memory address, then MMU 112 may use TLB 114 to determine the physical memory address that corresponds to a particular virtual memory address when TLB 114 stores the page entry for that virtual memory address. Using the determined physical memory address, first processing unit 110 can read from or write to a particular physical location of system memory 130. Similarly, if second processing unit 120 needs to translate a virtual memory address to a physical memory address, then MMU 122 may use TLB 124 to determine the physical memory address that corresponds to a particular virtual memory address when TLB 124 stores the page entry for that virtual memory address. Using the determined physical memory address, second processing unit 120 can read from or write to system memory 130.

As introduced above, TLB 114 and TLB 124 may be caches that store the virtual-to-physical mappings for only a subset of virtual memory addresses. TLB 114, therefore, may not store the entire virtual-to-physical mapping for processing unit 110, and similarly, TLB 124 may not store the entire virtual-to-physical mapping for second processing unit 120. In some instances, MMU 112 may need to determine a corresponding physical memory address for a virtual memory address that does not have a mapping stored in TLB 114. To determine a mapping for a virtual memory address not included in TLB 114, first processing unit 110 may access page tables 132 stored in system memory 130. Page tables 132 include the entire virtual-to-physical mapping for processing unit 110 and processing unit 120, and therefore, may be much larger than TLB 114 and TLB 124.

As with MMU 112, in some instances MMU 122 may need to determine a corresponding physical memory address for a virtual memory address that does not have a mapping stored in TLB 124. To determine a mapping for a virtual memory address not included in TLB 124, second processing unit 120 accesses page tables 132 stored in system memory 130. In this manner, MMU 122 may function in a substantially similar manner to MMU 112. Page tables 132 include the entire virtual-to-physical mapping for second processing unit 120 as well as for processing unit 110. In this manner, first processing unit 110 and second processing unit 120 share the same page table (e.g., one of page tables 132 in the example of FIG. 1).

In various examples, page tables 132 may be a single page table. Page tables 132 may also be a plurality of parallel pages. In the case where page tables 132 is a single page table, to translate from a physical to a virtual address for a memory page, first processing unit 110 and processing unit 120 may read a first page table entry from page tables 132. The first page table entry includes attribute data of a physical memory page for a first processing unit, e.g. first processing unit 110. In addition to the attribute data, the first page table entry also includes data associated with a second page table entry of the same page table. In various, the data associated with the second page table entry may be a pointer, which may comprise a virtual address and/or a physical address.

To determine the page attribute data for the second processing unit, second processing unit 120 reads the data associated with the second page table entry from the first page table entry. Second processing unit 120 uses the data associated with the second page table entry to read the second page table entry from page table entries 132. The second page table entry includes attribute data for second processing unit 120, which defines the accessibility of the memory page for second processing unit 120. In some examples, the pointer may point to a register of a register file of either processing unit 110 or second processing unit 120. The register of the register file may include attribute data of a page entry for second processing unit 120.

In an example where page tables 132 comprises a plurality of page tables, to translate from a physical to a virtual address for a memory page, first processing unit 110 and second processing unit 120 may read a first page table entry from page tables 132 at a specified virtual address. The first page table entry includes attribute data of a physical memory page associated with the virtual address for a first processing unit, e.g. first processing unit 110. Second processing unit 120 may read the first page table entry, and may also read a second page table entry from a different one of page tables 132 based on the virtual address. The second page table entry includes attribute data for second processing unit 120. In some examples, second processing unit 120 may read the first page table entry and the second page table entry in parallel to avoid waiting for the read of the read of the first page table entry to complete before reading the second page table entry.

In another example where page tables 132 comprises a plurality of page tables, to translate from a physical to a virtual address for a memory page, first processing unit 110 and second processing unit 120 may read a first page table entry from page tables 132 at a specified virtual address. The first page table entry includes attribute data of a physical memory page for a first processing unit, e.g. first processing unit 110. The first page table entry also includes data associated with a second page table entry. The second page table entry includes attribute data for second processing unit 120. Second processing unit 120 reads the data associated with the second page table entry, and based on the data, identifies a different page table that includes the second page table entry that has the page table attribute data for second processing unit 120. Second processing unit 120 then reads the second page table entry from the second page table based on the virtual address and accesses the physical page of memory using the attribute data of the second page table entry.

Page tables 132 may each include a plurality of page entries that map a virtual memory address to a physical memory address of a memory page. A memory page may be a portion of system memory 130 that is individually accessible via its physical memory address. Each page table entry may include one or more sets of attribute data. Each set of attribute data may set controls, such as permissions and access rights, for one or more processing units. Each page table entry may optionally include one or more additional sets of attribute data, such as a set of attribute data that set common controls for both first processing unit 110 and second processing unit 120.

In accordance with the techniques of this disclosure, first processing unit 110 and second processing unit 120 may be configured to read, with first processing unit 110, from a first page table entry in a first page table, determine, with first processing unit 110, first page attribute data from the first page table entry, wherein the first page attribute data define one or more accessibility attributes of the physical page of memory for the first processing unit, read, with second processing unit 120, the physical address from the first page table entry in the first page table, determine, with second processing unit 120, second page attribute data from an alternative location, wherein the alternative location is associated with the first page table entry, and wherein the second page attribute data define one or more accessibility attributes of the physical page of memory for second processing unit 120, access, with first processing unit 110, a physical page of memory associated with the physical address according to the one or more accessibility attributes of the first page attribute data, and access, with second processing unit 120, the physical page of memory associated with the physical address according to the one or more accessibility attributes of the second page attribute data.

The first set of attribute data and the second set of attribute data for page entries of page tables 132 may enable first processing unit 110 and second processing unit 120 to have different permissions and/or access rights while sharing a common page table. As one example, the first set of attribute data may be set such that first processing unit 110 has both read and write access to a particular memory page of system memory 130, while second processing unit 120 may have only read access to the same particular memory page. Of course, other configurations are also possible, such as second processing unit 120 having both read and write access while first processing unit 110 has only read access or one of first processing unit 110 and second processing unit 120 having both read and write access while the other has neither read nor write access.

FIG. 2 is a conceptual diagram illustrating an example technique for mapping a virtual memory address to a physical memory address in accordance with the techniques of this disclosure. FIG. 2 shows a first page table entry 140, second page table entry 142, and third page table entry 144. First page table entry 140, second page table entry 142, and third page table entry 144 may each be a page table entry in a different page table of page tables 132.

An application execution on first processing unit 110 or second processing unit 120 may attempt to access (read or write) a page of physical memory associated with a virtual memory address. A memory management unit (MMU) of a processing unit translates the virtual address to a physical address, and handles any reads or writes to the physical page of memory associated with the physical address. A translation lookaside buffer (TLB) may cache frequently used pages of memory based on their virtual addresses to reduce lookup latency from a page table.

In the example of FIG. 2, an application on first processing unit 110 that attempts to access a particular virtual address causes first MMU 112 to perform a lookup using TLB 114. If TLB 114 has a cached copy of the requested page table entry (referred to as a "first page table entry"), TLB 114 returns the requested first page table entry to MMU 112. If TLB 114 does not have a cached copy of the first page table entry, MMU 112 retrieves the requested first page table entry from page tables 132.

MMU 112 may retrieve page table entry 140 from a particular page table that includes page table entries associated with first processing unit 110. To retrieve the requested page table entry, MMU 112 or TLB 114 uses the virtual address of the requesting application as an index into the page table, and retrieves the requested page table entry associated with that virtual address.

After MMU 112 has retrieved the page table entry, MMU 112 translates the virtual address to a physical address. MMU 112 also determines attribute data from the page table entry. The attribute data defines accessibility permissions for first processing unit 110. After determining the accessibility permissions and the physical address associated with the virtual address of the physical page of memory, MMU 112 performs the memory access requested by the currently executing application.

First page table entry 140 includes physical address 146, attribute data 148, and valid bits 150. Physical address 146 indicates the physical address of physical memory page 152. MMU 112 makes any reads or writes to physical memory page 152 based on physical address 146. In this example, Attribute data 148 includes four fields, denoted as "R," (readable) "W," (writeable) "X," (executable) and "C" (cacheable). Each field is one or more bits in size, depending on the architecture of processing unit 110 and processing unit 120. The readable field value and writeable field values indicate whether processing unit 110 can read to, or write from physical memory page 152. The executable field value indicates whether processing unit 110 can execute the contents of physical memory page 152. The cacheable field value indicates whether processing unit 110 may cache the contents of physical memory page 152, e.g. in an L1 or L2 cache.

Once MMU 112 reads page table entry 140, MMU 112 translates the virtual address of the page table entry to physical address 146, MMU 112 may access physical memory page 142 based on physical address 146. MMU 112 ensures that the type of access, e.g. read, write, or execution, is permitted based on the field values of attribute data 148. MMU 112 may also be responsible for ensuring that a memory page designated as uncacheable is not cached by first processing unit 110. If the values of the attribute data fields indicate that the requested access type is not permitted, MMU 112 may throw an exception, which an operating system or the client application may handle Readable, writeable, executable, and cacheable fields are just some examples of fields values that first page table entry 140 may include. Page table entry 140 may include any combination and number of attribute data fields. First page table entry 140 may also include one or more additional values. In addition to the aforementioned fields, first page table entry 140 may also include one or more valid bits. Each valid bit indicates whether an additional page table entry, which includes attribute data for an additional processing unit such as second processing unit 120, is valid. If a valid bit indicates that the additional page table entry is valid, second processing unit 120 may read the attribute data of the page table entry associated with the valid bit. If the valid bit indicates that the additional page table entry is invalid, second processing unit 120 may not read the additional page table entry, in some examples. Instead, second processing unit 120 may use the attribute data of first page table entry 140.

The same application that executes on first processing unit 110 may also execute on second processing unit 120 and may also attempt to access the same virtual memory address. However, it may be desirable to assign the physical memory page a different set of accessibility values. For example, first processing unit 110 may be a CPU that fills a command buffer of a GPU, e.g. second processing unit 120, with GPU commands for second processing unit 120 to execute. The GPU commands should not be executable by first processing unit 110, but should be executable by second processing unit 120.

To apply different sets of attribute data for first processing unit 110 and 112, there may be one or more alternative locations that may include additional attribute data of physical memory page 142 for second processing unit 120. System memory 130 may include additional page tables that include attribute information for additional processing units. For example, first page table entry 140 may reside in a first page table. Second page table entry 142 may reside in a second page table, and third page table entry 144 may reside in a third page table.

When accessing a page of memory in accordance with the techniques of this disclosure, MMU 122 of second processing unit 120 accesses first page table entry 140 in the manner described above with respect to first processing unit 110. First page table entry 140 includes a mapping from a virtual address to physical address 146 of physical memory page 152, as well as attribute data 148 for processing unit 110. In some examples, first page table entry 140 may also include valid bits 150. MMU 122 also accesses an alternative location, such as a second page table entry, or a register that includes additional attribute information for second processing unit 120.

In one example, the alternative location that second processing unit 120 accesses to determine the attribute data for second processing unit 120 may be page table entry 142. MMU 122 reads page table entry 142 from a second, different page table of page table entries 132 than the page table that stores page table entry 140. MMU 122 indexes into the alternative location, i.e. the second page table, using the same virtual address used to index into the page table of page table entry 140. Page table entry 142 includes second attribute data 154. Attribute data may include field values that indicate whether second processing unit 120 may read, write, execute, and cache physical memory page 152. In some examples, processing unit reads page table entry 140 and page table entry 142 in parallel. Reading the two page table entries in parallel avoids the latency caused by waiting for the read of page table entry 140 to complete before reading page table entry 142.

In another example, the alternative location may be page table entry 144. In this example, MMU 122 of second processing unit 120 may read page table entry 144 to determine second attribute data of physical memory page 152 for second processing unit 120. Page table entry 144 includes two sets of attribute data, e.g. for two different processing units. One set of attribute data may be for second processing unit 120, and the other set of attribute data may be for a third processing unit. MMU 122 reads page table entry 144 from a different page table of page table entries 132 than the page table that stores page table entry 140. MMU 122 indexes into a different page table of page tables 132 using the same virtual address used to index into the page table that includes page table entry 140. Based on the attribute data of page table entry 144, MMU 122 determines accessibility permissions of physical memory page 152 for second processing unit 120.

Although page table entries 140, 142, and 144 are illustrated as having the same attribute fields, each of the page table entries may have different numbers or types of attribute fields. As one example, page table entry 142 may only include a single executable attribute field. Because page table entry 142 does not include values for every attribute field, MMU 122 may inherit or combine attribute field values from the page table entry 140 with the attribute field values of page table entry 142 to determine the accessibility permissions of physical memory page 152 for second processing unit 120. For instance, MMU 122 may use the readable, writeable, and cacheable attribute field values from page table entry 140, and the executable attribute field value from page table entry 142 to determine the final permissions of second processing unit 120 for physical memory page 152.

FIG. 3 is a conceptual diagram illustrating an example technique for mapping a virtual memory address to a physical memory address in accordance with the techniques of this disclosure. FIG. 3 includes a first page table entry 160, second page table entry 162, and third page table entry 164. First page table entry 160, second page table entry 162, and third page table entry 164 may each be a page table entry in a different page table of page tables 132.

An application execution on first processing unit 110 or second processing unit 120 may attempt access a page of physical memory associated with a virtual memory address. A memory management unit (MMU) of a processing unit translates the virtual address to a physical address, and handles any reads or writes to the physical page of memory associated with physical address. A translation lookaside buffer (TLB) may cache frequently used pages of memory based on their virtual addresses to reduce lookup latency from a page table.

In the example of FIG. 3, an application on first processing unit 110 that attempts to access a particular virtual address causes first MMU 112 to perform a lookup using TLB 114. If TLB 114 has a cached copy of the requested page table entry, TLB 114 returns the requested page table entry to MMU 112. If TLB 114 does not have a cached copy of the first page table entry, MMU 112 retrieves the requested page table entry from one page table of page tables 132 associated with first processing unit 110.

MMU 112 may retrieve page table entry 160 from a particular page table that includes page table entries associated with first processing unit 110. To retrieve the requested page table entry, MMU 112 or TLB 114 uses the virtual address of the requesting application as an index into the page table associated with first processing unit 110, and retrieves the requested page table entry, page table entry 160 in this example, associated with that virtual address.

Page table entry 160 includes physical address 166, attribute data 168, and identifier 170. Physical address 166 indicates the physical address of physical memory page 172. MMU 112 makes any reads or writes to physical memory page 172 based on physical address 166. In this example, Attribute data 168 includes four fields, denoted as "R," (readable) "W," (writeable) "X," (executable) and "C" (cacheable). Each field is one or more bits in size, depending on the architecture of processing unit 110 and processing unit 120. The readable field value and writeable field values indicate whether processing unit 110 can read to, or write from physical memory page 172. The executable field value indicates whether processing unit 110 can execute the contents of physical memory page 172. The cacheable field value indicates whether processing unit 110 may cache the contents of physical memory page 172, e.g. in an L1 or L2 cache.

Once MMU 112 reads page table entry 160, MMU 112 translates the virtual address to physical address 166, MMU 112 may access physical memory page 172 based on physical address 166. MMU 112 ensures that the type of access is permitted based on the field values of attribute data 168. MMU 112 may also be responsible for ensuring that a memory page designated as uncacheable is not cached by first processing unit 110. If the values of the attribute data fields indicate that the requested access type is not permitted, MMU 112 may throw an exception, which an operating system or the client application may handle.

Readable, writeable, executable, and cacheable fields are just some examples of fields values that first page table entry 160 may include. First page table entry 160 may also include one or more additional values and/or combinations of additional values. In addition to the aforementioned fields, page table entry 160 may also include one or more valid bits. Each valid bit indicates whether a particular page table entry, that includes attribute data for a different processing unit, is valid.

Some or all portions of the same application that executes on first processing unit 110 may also execute on processing unit 120 and may also attempt to access the same physical memory page 172 at the same physical and virtual memory addresses. However, it may be desirable, in some circumstances, to assign physical memory page 172 a different set of accessibility data, e.g., different permission for physical memory page 172. For example, first processing unit 110 may be a CPU that fills a command buffer of a GPU, e.g. second processing unit 120, with GPU commands for second processing unit 120 to execute. The GPU commands should not be executable by first processing unit 110, but should be executable by second processing unit 120. Accordingly, the executable attribute field value should be different for processing unit 110 and processing unit 120.

To apply different sets of attribute data for first processing unit 110 and 112, MMU 114 of second processing unit may read a second set of page attribute data from an alternative location. In the example of FIG. 3, system memory 130 may include additional page tables that include attribute information for additional processing units, which may comprise the alternative location. For example, first page table entry 160 may reside in a first page table. Second page table entry 162 may reside in a second page table, and third page table entry 164 may reside in a third page table.

When accessing a page of memory in accordance with the techniques of this disclosure, a second processing unit 120 accesses first page table entry 160 in the manner described above with respect to first processing unit 110. Page table entry 160 includes physical address 166 of physical memory page 172, well as attribute data 168 for processing unit 110, and identifier (ID) 170. Identifier 170 may be associated with the alternative location, which in the example of FIG. 3 is a second page table entry in a plurality of parallel page tables. In some examples, first page table entry 160 may also include one or more valid bits corresponding to one or more additional page table entries. Second processing unit 120 also accesses an alternative location, which in the example of FIG. 3 is an additional page table entry that includes second attribute data for second processing unit 120.

In the example of FIG. 3, second processing unit 120 determines an additional page table entry, such as page table entry 162, based on ID 170 of page table entry 160. Once MMU 122 has determined ID 170, second processing unit 120 reads the additional page table entry, page table entry 162, based on ID 170. In some examples, the value of ID 170 may indicate or identify a particular page table of page tables 132 that contains page table entry 162. MMU 122 reads page table entry 162 based on the same virtual address used to read page table entry 166, but from the page table indicated by ID 170.

Page table entry 162 includes page attribute data for second processing unit 120. The page attribute data of page table entry 162 may include field values that indicate whether second processing unit 120 may read, write, execute, and cache physical memory page 172. In some examples, the attribute data of page table entry 162 may include fewer attribute fields than page table entry 160. In this case, MMU 122 may determine attribute field values from page table entry 160 when page table entry 162 does include a corresponding attribute field value.

In some examples, the ID 170 of page table entry 160 may include more than one identifier value. As an example, in a system that has three processors, ID 170 may comprise two values. The first value indicates a page table for second processing unit 120, and the second value indicates a page table with attribute data for a third processing unit. Both the first and second page tables indicated by ID 170 may be included in page tables 132.

Figure 4:
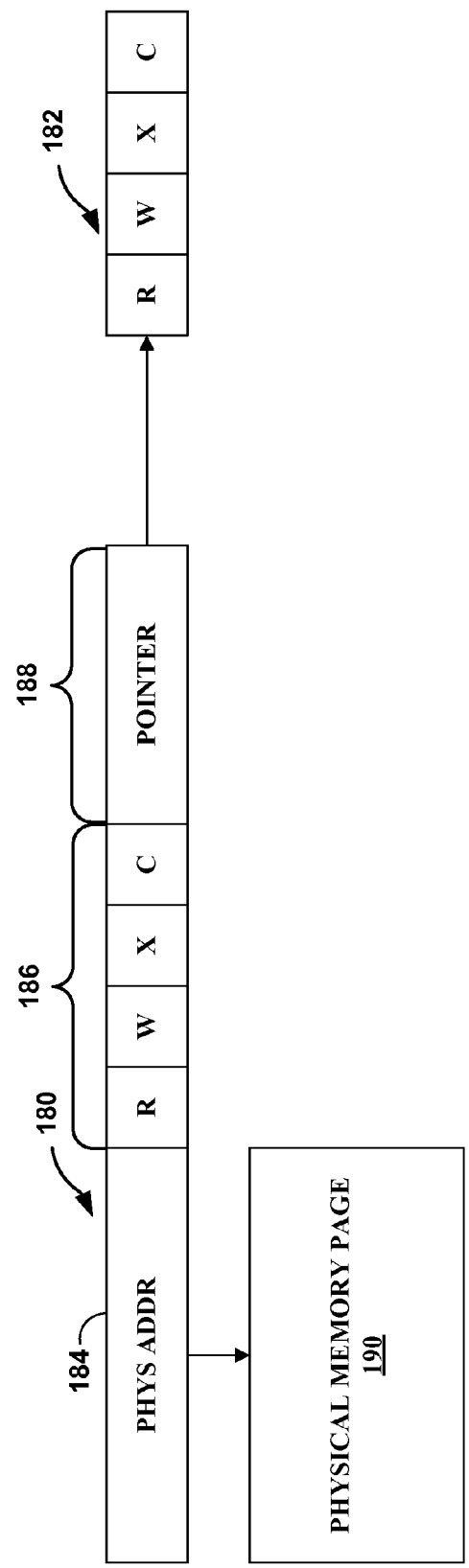
FIG. 4 is a conceptual diagram illustrating an example technique for mapping a virtual memory address to a physical memory address in accordance with the techniques of this disclosure.

FIG. 4 is a conceptual diagram illustrating an example technique for mapping a virtual memory address to a physical memory address in accordance with the techniques of this disclosure. FIG. 4 includes a first page table entry 180, and a second page table entry 182. First page table entry 180, and second page table entry 182 may each be page table entries in a single page table of page table entries 132. In the example of FIG. 4, page table entries 132 may comprise a single page table.

In the example of FIG. 4, an application executing on first processing unit 110 or second processing unit 120 may attempt to access a page of physical memory associated with a virtual memory address. An MMU of a processing unit translates the virtual address to a physical address, and handles any reads or writes to the physical page of memory associated with the physical address. A TLB may cache frequently used pages of memory based on their virtual addresses to reduce lookup latency from a page table.

In the example of FIG. 4, an application executing on first processing unit 110 that attempts to access a particular virtual address causes first MMU 112 to perform a lookup using TLB 114. If TLB 114 has a cached copy of the requested page table entry (referred to as a "first page table entry"), TLB 114 returns the requested page table entry to MMU 112. If TLB 114 does not have a cached copy of the first page table entry, MMU 112 retrieves the requested page table entry from the page table.

MMU 112 may retrieve page table entry 180 from a particular page table that includes page table entries associated with first processing unit 110. To retrieve the requested page table entry, MMU 112 or TLB 114 uses the virtual address of the requesting application as an index into the page table, and retrieves the requested page table entry, page table entry 180 in this example, associated with that virtual address.

Page table entry 180 includes physical address 184, attribute data 186, and pointer 188. Physical address 184 indicates the physical address of physical memory page 190. MMU 112 makes any reads or writes to physical memory page 190 based on physical address 184. In this example, Attribute data 188 includes four fields, denoted as "R," (readable) "W," (writeable) "X," (executable) and "C" (cacheable). Each field is one or more bits in size, depending on the architecture of first processing unit 110 and second processing unit 120. The readable field value and writeable field values indicate whether processing unit 110 can read to, or write from physical memory page 190. The executable field value indicates whether processing unit 110 can execute the contents of physical memory page 190. The cacheable field value indicates whether processing unit 110 may cache the contents of physical memory page 190, e.g. in an L1 or L2 cache.

Once MMU 112 reads page table entry 180, MMU 112 translates the virtual address to physical address 184, MMU 112 may access physical memory page 190 based on physical address 184. MMU 112 ensures that the type of access, e.g. read, write, caching, or execution, is permitted based on the field values of attribute data 186. MMU 112 may also be responsible for ensuring that a memory page designated as uncacheable is not cached by first processing unit 110. If the values of the attribute data fields indicate that the requested access type is not permitted, MMU 112 may throw an exception, which an operating system or the client application may handle.

Readable, writeable, executable, and cacheable fields are just some examples of fields values that page table entry 180 may include. First page table entry 180 may also include one or more additional values. In addition to the aforementioned fields, page table entry 180 may also include one or more valid bits. Each valid bit indicates whether a particular page table entry, that includes attribute data for a different processing unit, is valid.

Some or all portions of the same application that executes on first processing unit 110 may also execute on second processing unit 120 and may also attempt to access the same physical memory page 190 at the same physical and virtual memory addresses. However, it may be desirable to assign physical memory page 190 a different set of page attribute data, e.g. permissions, such as read, write, cacheability, and execution permissions. For example, first processing unit 110 may be a CPU that fills a command buffer of a GPU, e.g. second processing unit 120, with GPU commands for second processing unit 120 to execute. The GPU commands should not be executable by first processing unit 110, but should be executable by second processing unit 120. Accordingly, the executable attribute field value should be different for processing unit 110 and processing unit 120.

To apply different sets of attribute data for processing unit 110 and 112, there may be an alternative location, such as system memory 130, that includes additional include attribute data for additional processing units. When accessing a page of memory in accordance with the techniques of this disclosure, MMU 122 of second processing unit 120 accesses page table entry 180 in the manner described above with respect to first processing unit 110. Page table entry 180 includes physical address 184 of physical memory page 190, as well as attribute data 168 for processing unit 110, and pointer 188. In some examples, page table entry 180 may also include one or more valid bits corresponding to one or more additional page table entries. In accordance with the techniques of this disclosure, second processing unit 120 also accesses the alternative location, i.e. a page table entry that includes additional attribute data for second processing unit 120.

In the example of FIG. 4, second processing unit 120 determines the alternative location, e.g. page table entry 182, based on the value of pointer 188. Once MMU 122 has pointer 188, second processing unit 120 reads the additional page table entry, e.g. page table entry 182, based on the value of pointer 188. In some examples, the value of pointer 188 may indicate the virtual address and/or physical address of the alternative location, e.g. a particular page table within the same page table as page table entry 184. If pointer 188 includes a virtual address, an MMU, such as MMU 112 or MMU 112 may perform a second translation from a virtual address to a physical address.

Page table entry 182 includes attribute data for second processing unit 120. The attribute data of page table entry 182 may include field values that indicate whether second processing unit 120 may read, write, execute, and cache physical memory page 190. In some examples, the attribute data of page table entry 182 may include fewer attribute fields than page table entry 180. In this case, MMU 122 may determine attribute field values from page table entry 180 when page table entry 182 does include a corresponding attribute field value.

In some examples, pointer 188 of page table entry 180 may include more than one value. As an example, in a system that has three processors, pointer 188 may comprise two values (e.g., virtual addresses and/or physical addresses). The first value indicates a page table for second processing unit 120, and the second value indicates a page table with attribute data for a third processing unit. Both the first and second page tables indicated by pointer 188 may be included in the same page table as page table entry 180. Additionally, pointer value 188 may comprise a single value, which may indicate a single alternative location value, e.g. a page table entry, which includes attribute data for more than one processing unit. Using a single page table entry to specify the attribute data for multiple processors may reduce memory requirements for a page table in some examples.

In another example, pointer 188 may not indicate a separate page table entry, but rather may indicate an alternative location comprising a register, such as one of registers 116 or registers 126 of FIG. 1, which includes additional page attribute data for a second processing unit, such as processing unit 120. If the value of pointer 188 indicates that attribute data for second processing unit 120 is stored in a register file, e.g. a register in registers 116 or registers 126, MMU 122 may read the attribute data from the specified register of a register file. In an example where first processing unit 110 or second processing unit 120 conforms to the ARM architecture, the register that the pointer points to may be the Memory Attribute Indirection Registers ("MAIRn registers"). In other examples, any register of any processing unit of computing device 110 (e.g., first processing unit 110 or second processing unit 120) may be used to store attribute data for one or more processors.

Figure 5:
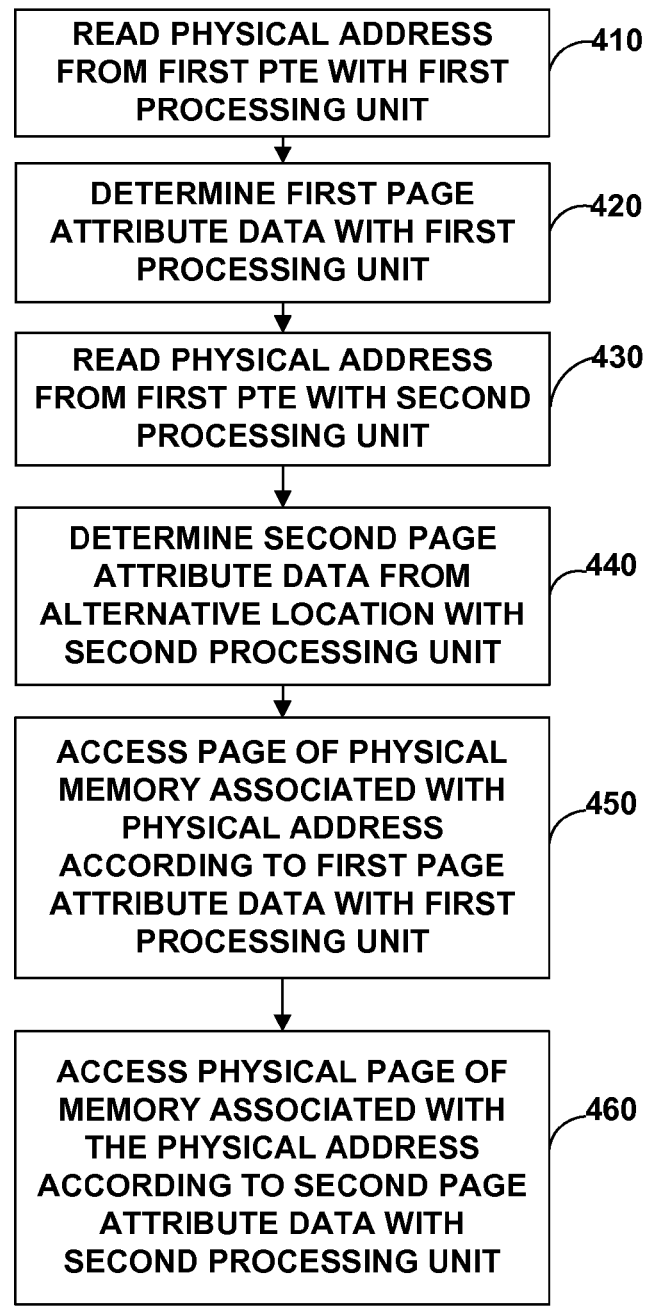
FIG. 5 is a flow diagram illustrating virtual memory address to physical memory address mapping techniques described in accordance with the techniques of this disclosure.

FIG. 5 is a flow diagram illustrating virtual memory address to physical memory address mapping techniques described in accordance with the techniques of this disclosure. The techniques of FIG. 5 can be performed by a computing device with two or more processing units, such as computing device 100 of FIG. 1. The techniques of FIG. 5 will be described with reference to computing device 100, although it should be understood that the techniques of FIG. 5 are applicable to a wide array of computing devices and not limited only to devices configured as computing device 100. In the example of FIG. 5, first processing unit 110 may be a CPU, and second processing unit 120 may be a GPU. In various examples, first processing unit 110 and/or second processing unit 120 may comprise any IO device, such as a video or still camera, network card, digital signal processor (DSP), I/O processor or controller, or any other processing unit that may be included in computing device 100.

First processing unit 110 reads a physical address from a first page table entry in a first page table (410). First processing unit 110 determines first page attribute data from the first page table entry, wherein the first page attribute data define one or more accessibility attributes of the physical page of memory for the first processing unit (420). Second processing unit 120 also reads the physical address from the first page table entry in the first page table (430). In some examples, second processing unit 120 may read the second page table entry from the second page table in parallel with reading the first page table entry.

Second processing unit 120 determines second page attribute data from an alternative location, wherein the alternative location is associated with the first page table entry, and wherein the second page attribute data define one or more accessibility attributes of the physical page of memory for the second processing unit (440). First processing unit 110 then accesses a physical page of memory associated with the physical address according to the one or more accessibility attributes of the first page attribute data (450), and accesses the physical page of memory associated with the physical address according to the one or more accessibility attributes of the second page attribute data (460). In some examples, the first and second page attribute data define whether the page of memory is at least one of readable, writeable, cacheable, executable, and dirty. In some examples, the second page table entry comprises a second page table entry of the first page table, and to read the page table entry, second processing 120 unit reads the second page table entry from the first page table based on a pointer value of the first page table entry. In some instances, the pointer value may comprise at least one of a virtual address and a physical address. In other examples, the alternative location may comprise a register, wherein the register is associated with the first page table entry based on a pointer value in the first page table entry.

In an example, the first processing unit may comprise a first memory management unit (MMU) and the second processing unit may comprise a second MMU, wherein the first MMU is configured to access at least one of the first page table and the alternate location, and the second MMU is configured to access at least one of the first page table and the alternate location.

In one example, the alternative location may be a second page table entry in a second page table, and second processing unit 120 may read data associated with the second page table from the first page table entry. Second processing unit 120 may read data associated with the second page table from the first page table entry. Reading the second page attribute data may comprise identifying, with second processing unit 120, the second page table based on the data associated with the second page table. In some examples, the data associated with the second page table comprises an identifier that identifies the second page table from a plurality of parallel page tables.

The process illustrated in FIG. 5 may further include combining, with second processing unit 120, the first page attribute data with second page attribute data to form one or more accessibility attributes of combined page attribute data. Second processing unit 120 accesses the physical page of memory associated with the physical address according to the one or more attributes of the combined page attribute data. In some examples, the second page attribute data includes one or more attribute values that are different from the one or more attribute values of the first page attribute data.

The process of FIG. 5 may further include reading, with first processing unit 110, valid data from the first page table entry that indicates whether the second page attribute data is valid. To determine the second page attribute data, second processing unit 120 may determine the second page attribute data if the valid data from the first page table entry indicates that the second page attribute data is valid.

Examples of system memory 130 include, but are not limited to, a random access memory (RAM), a read only memory (ROM), an electrically erasable programmable read-only memory (EEPROM), CD-ROM or other optical disk storage, magnetic disk storage, or other magnetic storage devices, flash memory, or any other medium that can be used to carry or store desired program code in the form of instructions or data structures and that can be accessed by a computer or a processor. System memory 130 may, in some examples, be considered as a non-transitory storage medium. The term "non-transitory" may indicate that the storage medium is not embodied in a carrier wave or a propagated signal. However, the term "non-transitory" should not be interpreted to mean that system memory 130 is non-movable. As one example, system memory 130 may be removed from device 100, and moved to another device. As another example, a storage device, substantially similar to system memory 130, may be inserted into device 100. In certain examples, a non-transitory storage medium may store data that can, over time, change (e.g., in RAM).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of accessing memory comprising:
reading, with a first processing unit, a physical address from a first page table entry in a first page table;
determining, with the first processing unit, first page attribute data from the first page table entry, wherein the first page attribute data define one or more accessibility attributes of the physical page of memory for the first processing unit, and wherein the first page attribute data is included in one or more first fields;
reading, with a second processing unit, the physical address from the first page table entry in the first page table;
determining, with the second processing unit, second page attribute data from an alternative location, wherein the alternate location includes one or more second fields that are separate from the one of more first fields, the alternate location is a page table entry that is separate from the first page table entry, the alternative location is associated with the first page table entry, and wherein the second page attribute data define one or more accessibility attributes of the physical page of memory for the second processing unit;
accessing, with the first processing unit, a physical page of memory associated with the physical address according to the one or more accessibility attributes of the first page attribute data; and
accessing, with the second processing unit, the physical page of memory associated with the physical address according to the one or more accessibility attributes of the second page attribute data.

2. The method of claim 1, wherein the alternative location comprises a second page table entry in a second page table, wherein determining the second page attribute data further comprises:
determining, with the second processing unit, the second page attribute data from the second page table entry in parallel with reading the first page table entry.

3. The method of claim 1, wherein the alternative location is a second page table entry in a second page table, the method further comprising:
reading, with the second processing unit, data associated with the second page table from the first page table entry,
wherein determining the second page attribute data further comprises:
identifying, with the second processing unit, the second page table based on the data associated with the second page table.

4. The method of claim 3, wherein the data associated with the second page table comprises an identifier that identifies the second page table from a plurality of parallel page tables.

5. The method of claim 1, wherein the alternative location comprises a second page table entry in the first page table,
wherein the second page table entry in the first page table is associated with the first page table entry based on a pointer value of the first page table entry.

6. The method of claim 5, wherein the pointer value comprises at least one of a virtual address and a physical address.

7. The method of claim 1, further comprising:
combining, with the second processing unit, the one or more attributes of the first page attribute data with one or more attributes of the second page attribute data to form one or more accessibility attributes of combined page attribute data,
wherein the second processing unit accesses the physical page of memory associated with the physical address according to the one or more attributes of the combined page attribute data.

8. The method of claim 7, wherein the second page attribute data includes one or more attribute values that are different from the one or more attribute values of the first page attribute data.

9. The method of claim 1, further comprising:
reading, with the first processing unit, valid data from the first page table entry that indicates whether the second page attribute data is valid,
wherein determining the second page attribute data further comprises:

determining, with the second processing unit, the second page attribute data if the valid data from the first page table entry indicates that the second page attribute data is valid.

10. The method of claim 1, wherein the first page attribute data and the second page attribute data define whether the page of memory is at least one of:
readable, writeable, cacheable, executable, and dirty.

11. The method of claim 1, wherein the alternative location comprises a register,
wherein the register is associated with the first page table entry based on a pointer value in the first page table entry.

12. The method of claim 1, wherein the first processing unit is a CPU, and the second processing unit is a GPU.

13. The method of claim 12 wherein the first processing unit comprises a first memory management unit (MMU) and the second processing unit comprises a second MMU, wherein the first MMU is configured to access at least one of the first page table and the alternate location, and the second MMU is configured to access at least one of the first page table and the alternate location.

14. An apparatus comprising:
means for storing:
a first page table that includes a first page table entry, wherein the first page table entry further includes a physical address;
an alternative location associated with the first page table entry; and
a physical page of memory associated with the physical address;
first means for processing, wherein the first means for processing comprises:
means for reading, from the first page table entry, the physical address;
means for determining first page attribute data from the first page table entry, wherein the first page attribute data define one or more accessibility attributes of the physical page of memory for the first means for processing, and wherein the first page attribute data is included in one or more first fields; and
means for accessing a physical page of memory with the physical address according to the one or more accessibility attributes of the first page attribute data;
a second means for processing, wherein the second means for processing comprises:
means for reading, from the first page table, the first page table entry;
means for determining the physical address from the first page table entry;
means for determining second page attribute data from the alternative location, wherein the alternate location includes one or more second fields that are separate from the one of more first fields, the alternate location is a page table entry that is separate from the first page table entry, the alternative location is associated with the first page table entry, and wherein the second page attribute data define one or more accessibility attributes of the physical page of memory for the second means for processing; and
means for accessing the physical page of memory associated with the physical address according to the one or more accessibility attributes of the second page attribute data.

15. The apparatus of claim 14, wherein the alternative location comprises a second page table entry in a second page table, wherein the means for determining the second page attribute data further comprises:
means for determining the second page attribute data from the second page table entry in parallel with the means for determining the first page attribute data.

16. The apparatus of claim 14, wherein the alternative location is a second page table entry in a second page table, the second means for processing further comprising:
means for reading data associated with the second page table from the first page table entry,
wherein the means for determining the second page attribute data further comprises:
means for identifying the second page table based on the data associated with the second page table.

17. The apparatus of claim 16, wherein the data associated with the second page table comprises an identifier that identifies the second page table from a plurality of parallel page tables.

18. The apparatus of claim 14, wherein the alternative location comprises a second page table entry in the first page table,
wherein the second page table entry in the first page table is associated with the first page table entry based on a pointer value of the first page table entry.

19. The apparatus of claim 18, wherein the pointer value comprises at least one of a virtual address and a physical address.

20. The apparatus of claim 14, wherein the second means for processing further comprises:
means for combining the one or more attributes of the first page attribute data with one or more attributes of the second page attribute data to form one or more accessibility attributes of combined page attribute data,
wherein the second means for processing accesses the physical page of memory associated with the physical address according to the one or more attributes of the combined page attribute data.

21. The apparatus of claim 20, wherein the second page attribute data includes one or more attribute values that are different from the one or more attribute values of the first page attribute data.

22. The apparatus of claim 14, wherein the first means for processing further comprises means for reading valid data from the first page table entry that indicates whether the second page attribute data is valid,
wherein the means for determining the second page attribute data further comprises:
means for determining the second page attribute data if the valid data from the first page table entry indicates that the second page attribute data is valid.

23. The apparatus of claim 14, wherein the first page attribute data and the second page attribute data define whether the page of memory is at least one of:
readable, writeable, cacheable, executable, and dirty.

24. The apparatus of claim 14, wherein the alternative location comprises a register,
wherein the register is associated with the first page table entry based on a pointer value in the first page table entry.

25. The apparatus of claim 14, wherein the first means for processing is a CPU, and the second means for processing is a GPU.

26. The apparatus of claim 25, wherein the first means for processing comprises a first memory management unit (MMU) and the second means for processing comprises a second MMU, wherein the first MMU comprises configured means for accessing at least one of the first page table and the alternate location; and the second MMU comprises means for accessing at least one of the first page table and the alternate location.

27. An apparatus comprising:
memory that stores:
a first page table that includes a first page table entry, wherein the first page table entry further includes a physical address;
an alternative location associated with the first page table entry; and
a physical page of memory associated with the physical address;
a first processing unit configured to:
read, from the first page table, the physical address;
determine first page attribute data from the first page table entry, wherein the first page attribute data define one or more accessibility attributes of the physical page of memory for the first processing unit, and wherein the first page attribute data is included in one or more first fields; and
access the physical page of memory associated with the physical address according to the one or more accessibility attributes of the first page attribute data;
a second processing unit configured to:
read, from the first page table, the first page table entry;
determine the physical address from the first page table entry;
determine second page attribute data from the alternative location, wherein the alternate location includes one or more second fields that are separate from the one of more first fields, the alternate location is a page table entry that is separate from the first page table entry, the alternative location is associated with the first page table entry, and wherein the second page attribute data define one or more accessibility attributes of the physical page of memory for the second processing unit; and
access the physical page of memory associated with the physical address according to the one or more accessibility attributes of the second page attribute data.

28. The apparatus of claim 27, wherein the alternative location comprises a second page table entry in a second page table, wherein to determine the second page attribute data, the second processing unit is further configured to:
determine the second page attribute data from the second page table entry and read the first page table entry in parallel.

29. The apparatus of claim 27, wherein the alternative location is a second page table entry in a second page table, wherein the second processing unit is further configured to:
read data associated with the second page table from the first page table entry, and
wherein to determine the second page attribute data, the second processing unit is further configured to identify the second page table based on the data associated with the second page table.

30. The apparatus of claim 29, wherein the data associated with the second page table comprises an identifier that identifies the second page table from a plurality of parallel page tables.

31. The apparatus of claim 27, wherein the alternative location comprises a second page table entry in the first page table, wherein the second page table entry in the first page table is associated with the first page table entry based on a pointer value of the first page table entry.

32. The apparatus of claim 31, wherein the pointer value comprises at least one of a virtual address and a physical address.

33. The apparatus of claim 27, wherein the second processing unit is further configured to:
combine the one or more attributes of the first page attribute data with one or more attributes of the second page attribute data to form one or more accessibility attributes of combined page attribute data,
wherein the second means processing unit accesses the physical page of memory associated with the physical address according to the one or more attributes of the combined page attribute data.

34. The apparatus of claim 33, wherein the second page attribute data includes one or more attribute values that are different from the one or more attribute values of the first page attribute data.

35. The apparatus of claim 27, wherein the first processing unit further is further configured to read valid data from the first page table entry that indicates whether the second page attribute data is valid,
wherein to determine the second page attribute data, the second processing unit is further configured to:
determine the second page attribute data if the valid data from the first page table entry indicates that the second page attribute data is valid.

36. The apparatus of claim 27, wherein the first page attribute data and the second page attribute data define whether the page of memory is at least one of:
readable, writeable, cacheable, executable, and dirty.

37. The apparatus of claim 27, wherein the alternative location comprises a register,
wherein the register is associated with the first page table entry based on a pointer value in the first page table entry.

38. The apparatus of claim 27, wherein the first processing unit is a CPU, and the second processing unit is a GPU.

39. The apparatus of claim 38, wherein the first means for processing comprises a first memory management unit (MMU) and the second means for processing comprises a second MMU,
wherein the first MMU comprises configured means for accessing at least one of the first page table and the alternate location; and
the second MMU comprises means for accessing at least one of the first page table and the alternate location.

40. A non-transitory computer-readable storage medium having stored thereon instructions that when executed cause a first processing unit and a second processing unit to:
read, with a first processing unit, a physical address from a first page table entry in a first page table;
determine, with the first processing unit, first page attribute data from the first page table entry, wherein the first page attribute data define one or more accessibility attributes of the physical page of memory for the first processing unit, and wherein the first page attribute data is included in one or more first fields;
read, with the second processing unit, the physical address from the first page table entry in the first page table;
determine, with the second processing unit, second page attribute data from an alternative location, wherein the alternate location includes one or more second fields that are separate from the one of more first fields, the alternate location is a page table entry that is separate from the first page table entry, the alternative location is associated with the first page table entry, and wherein the second page attribute data define one or more accessibility attributes of the physical page of memory for the second processing unit;

access, with the first processing unit, a physical page of memory associated with the physical address according to the one or more accessibility attributes of the first page attribute data; and access, with the second processing unit, the physical page of memory associated with the physical address according to the one or more accessibility attributes of the second page attribute data.

41. The non-transitory computer-readable storage medium of claim 40, wherein the alternative location comprises a second page table entry in a second page table, wherein the instructions that cause the second processing unit to determine the second page attribute data further comprise instructions that, when executed, cause the second processing unit to:

determine the second page attribute data from the second page table entry and read the first page table entry in parallel.

42. The non-transitory computer-readable storage medium of claim 40, wherein the alternative location is a second page table entry in a second page table, further comprising instructions that, when executed, cause the second processing unit to:

read data associated with the second page table from the first page table entry, wherein the instructions that cause the second processing unit to determine the second page attribute data further comprise instructions, that when executed, cause the second processing unit to:

identify the second page table based on the data associated with the second page table.

43. The non-transitory computer-readable storage medium of claim 42, wherein the data associated with the second page table comprises an identifier that identifies the second page table from a plurality of parallel page tables.

44. The non-transitory computer-readable storage medium of claim 40, wherein the alternative location comprises a second page table entry in the first page table, wherein the second page table entry in the first page table is associated with the first page table entry based on a pointer value of the first page table entry.

45. The non-transitory computer-readable storage medium of claim 44, wherein the pointer value comprises at least one of a virtual address and a physical address.

46. The non-transitory computer-readable storage medium of claim 40, further comprising instructions, that when executed, cause the second processing unit to:

combine the one or more attributes of the first page attribute data with one or more attributes of the second page attribute data to form one or more accessibility attributes of combined page attribute data, wherein the second processing unit accesses the physical page of memory associated with the physical address according to the one or more attributes of the combined page attribute data.

47. The non-transitory computer-readable storage medium of claim 46, wherein the second page attribute data includes one or more attribute values that are different from the one or more attribute values of the first page attribute data.

48. The non-transitory computer-readable storage medium of claim 40, further comprising instructions that, when executed, cause the first processing unit to:

read valid data from the first page table entry that indicates whether the second page attribute data is valid, wherein the instructions that cause the second processing unit to determine the second page attribute data further comprise instructions that, when executed, cause the second processing unit to:

determine the second page attribute data if the valid data from the first page table entry indicates that the second page attribute data is valid.

49. The non-transitory computer-readable storage medium of claim 40, wherein the first page attribute data and the second page attribute data define whether the page of memory is at least one of:

readable, writeable, cacheable, executable, and dirty.

50. The non-transitory computer-readable storage medium of claim 40, wherein the alternative location comprises a register, wherein the register is associated with the first page table entry based on a pointer value in the first page table entry.

51. The non-transitory computer-readable storage medium of claim 40, wherein the first processing unit is a CPU, and the second processing unit is a GPU.

52. The non-transitory computer-readable storage medium of claim 51, wherein the first processing unit comprises a first memory management unit (MMU) and the second processing unit comprises a second MMU, wherein the first MMU is configured to access at least one of the first page table and the alternate location, and the second MMU is configured to access at least one of the first page table and the alternate location.

* * * * *